United States Patent [19]

Donag

[11] Patent Number: 5,040,633

[45] Date of Patent: Aug. 20, 1991

[54] DEVICE FOR AUTOMATIC BRAKE OF A VEHICLE ON STRIKING AN OBSTACLE

[76] Inventor: Dror Donag, 13, Herbert Samuel St., Hedera 38362, Israel

[21] Appl. No.: 447,627

[22] Filed: Dec. 8, 1989

[51] Int. Cl.$^5$ .............................................. B60K 28/00
[52] U.S. Cl. .................................... 180/275; 180/274
[58] Field of Search ............... 180/274, 275, 276, 277, 180/278

[56] References Cited

U.S. PATENT DOCUMENTS

| | | | |
|---|---|---|---|
| 3,810,520 | 5/1974 | Iwata et al. | 180/275 |
| 3,923,330 | 12/1975 | Viall, Sr. et al. | 180/275 |
| 3,986,577 | 10/1976 | Ebbesson et al. | 180/275 |
| 4,591,019 | 5/1986 | Fisher et al. | 180/275 |
| 4,674,590 | 6/1987 | Krieg | 180/275 |
| 4,799,570 | 1/1989 | Andersson et al. | 180/275 |

Primary Examiner—Kenneth R. Rice

[57] ABSTRACT

A device for automatic brake of cars and trucks on striking an obstacle, mainly in reverse driving. The device incorporates two types of impact sensors, one of which is operated by the mudguards, while the second is of a spongy bumper type. The invention's novelty lies in the spongy bumper type sensor, which appears in two alternatives: one alternative is a spongy impact sensor with a rigid casing, and the other is a spongy impact sensor with rubber switches. The device further incorporates means for operating the brakes, including, in the case of vehicles with a hydraulic brake system, an electromagnetic valve installed on the air chamber in the brake booster. A control system enabling reverse driving at a controlled speed is also described.

8 Claims, 5 Drawing Sheets

DEVICE FOR AUTOMATIC BRAKE OF A VEHICLE ON STRIKING AN OBSTACLE

BACKGROUND OF THE INVENTION

1. Field of the Invention

The invention relates, in general, to safety brake systems and, in particular, to crash-prevention systems during reverse driving.

2. Description of the Prior Art

The previous automatic brake systems were intended to prevent accidents, but they did not show much consideration for people. The sensing means themselves could cause injury.

Following is a list of several patents on the subject: U.S. Pat. Nos. 3744588, 4641871, 4403674, 3945672, 4633968, 392330.

The chief novelty of the invention is in the type of sensors. This invention is in part a continuation and enhancement of the U.S. patent application No. 06/891125, an application which is now abandoned.

DEFINITION OF THE INVENTION

A device for automatic brake of a vehicle on striking an obstacle, comprising:

Sensors for detecting the striking of an obstacle, including:
(a) A spongy impact sensor with a rigid casing,
(b) A spongy impact sensor with rubber switches,
(c) A mudguard sensor, Control means for actuating the brake applying, according to an electric signal delivered from the impact sensors depending on the direction of travel and the vehicle's speed, Means for actuating the brake applying, including:

A brake booster with an electromagnetic valve which is installed on the air chamber in the brake booster and which causes the actuating of the car brakes applying, in a hydraulic brake system, An electromagnetic regulator which is attached parallel to the brake pedal regulator, in a pneumatic brake system, Means of preventing release of the brakes after removal of the obstacle, including a nonreversing electromagnetic valve installed behind the brake booster, in a hydraulic brake system.

PURPOSES AND ADVANTAGES

This invention is designed to provide automatic brake power to a vehicle travelling in reverse, when coming into contact with an obstacle. The invention, in contrast to most of the other inventions in this area, is suited for all kinds of motor vehicles. It can be installed both on large trucks and trailers and on small passenger cars.

This invention shows great consideration for people, having two main types of sensing means designed to give warning of contact with an obstacle. One type, which appears here in two alternatives, is the spongy bumper sensor. This sensor is composed principally of a thick sponge on which switches are located. At a low speed, the thickness and softness of the sponge serve as a braking distance before the obstacle comes into contact with the rigid part of the car's body. In addition, the sponge's softness can prevent injury to a person. The second type of sensing means is the mudguard sensor. This type of sensor is especially suited for large vehicles, such as trucks and trailers, and is designed to prevent injury to children playing underneath trucks.

The impact brake can be very effective in reverse driving at a low speed. In order to ensure a low speed, the control means are attached to the vehicle's speedometer, and beyond a certain defined speed they cause the brakes to be activated, thus reducing the vehicle's speed.

This invention is designed for use mainly in reverse driving. If suitable sensors are installed at the front of the vehicle, this can prevent accidents with pedestrians who burst into the path of the vehicle, in forward driving at a low speed.

If sensing means are installed at the front of the vehicle, this can provide an additional advantage of facilitating parking between two cars. The sensing means enable the driver to utilize the entire space between the cars without fear of causing damage.

To operate the brakes in a vehicle with a hydraulic brake system, it is necessary to add to the vehicle an electromagnetic valve which is attached to the brake booster. This addition is a simple and convenient method for emergency activation of the brakes. To operate the brakes in a vehicle with a pneumatic brake system, it is necessary to attach an electromagnetic valve parallel to the regulator activated by the pedal brake. This valve will perform the same action as that by the pedal brake, but electrically.

The instruction to activate the brakes following receipt of a signal from the impact sensors (and other information) is given from the control system. The control system and its attachments are electrical. The work in the electrical method is a very simple means, in contrast to systems which require mechanical transmissions or systems that require piping and valves.

This invention is adjusted so as to continue to brake the vehicle even if the obstacle is removed - a person has fallen. In a vehicle with a hydraulic brake system, a nonreversing valve is added which prevents the retreat of the oil from the brakes and thus prevents the brakes from being released even if the vehicle's motor has been extinguished.

DESCRIPTION OF THE PREFERRED EMBODIMENT

The purpose of the invention is to cause a vehicle driving in reverse to brake when it strikes an obstacle. This confronts the invention with two principal requirements: The first requirement is to detect the impaction on the obstacle. The second requirement is to activate the car brakes following detection of the said impaction. To detect the impaction on the obstacle, the invention incorporates three impact sensors. Two sensors are of the spongy bumper type, and the third is a mudguard-type sensor.

Figure 1:
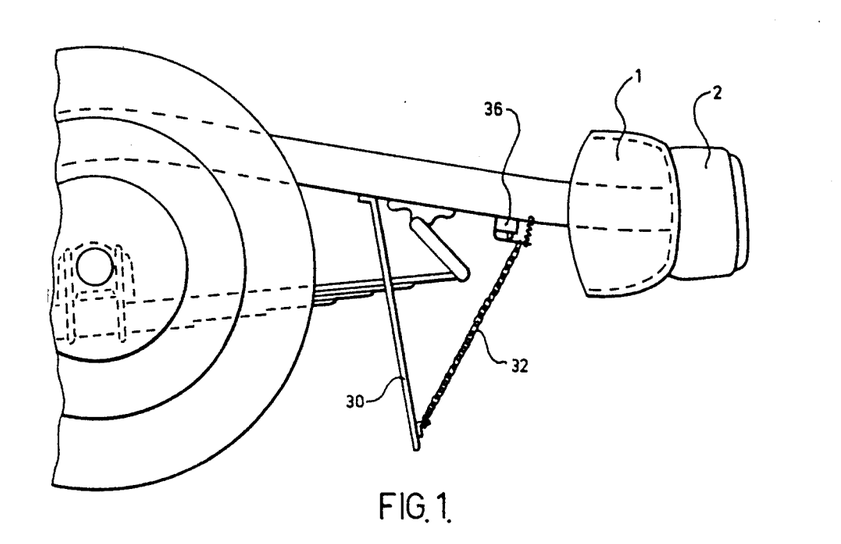
FIG. 1—is a side view of the rear part of the vehicle's chassis on which the present invention is installed.

FIG. 1 provides a rear view of the chassis of the motor vehicle on which the present invention is installed. 1 is the car bumper on which a spongy bumper sensor 2 is installed. The main parts of the mudguard sensor are the mudguard 30 and the switch 36 which is operated by means of the chain 32.

FIGS. 2-8 provide a view of the first impact sensor discussed here, namely, the spongy bumper with the rigid casing.

Figure 2:
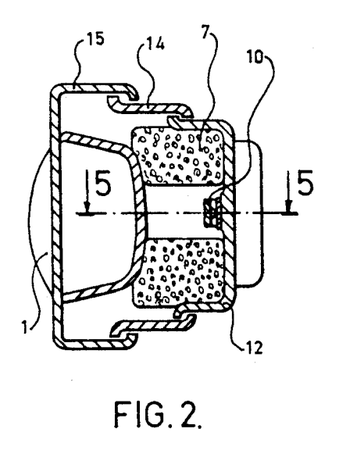
FIG. 2—is an enlarged cross section of the spongy bumper sensor with the rigid casing.
Figure 3:
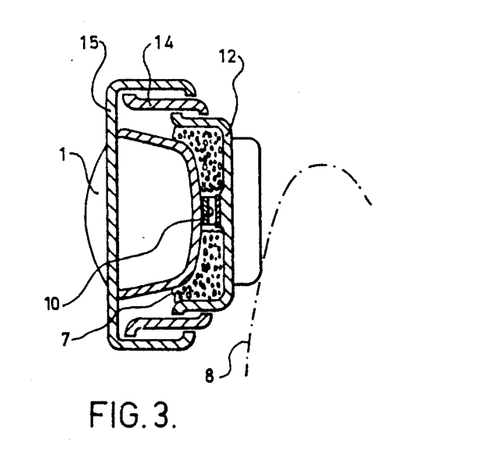
FIG. 3—shows the bumper in FIG. 2 during contact with an obstacle.

FIG. 2 shows in cross section the parts of the rigid spongy bumper. 1 is the car bumper to which part 15 is permanently attached. Parts 12, 14 and 15 make up the rigid casing, and their flexibility derives from their telescopic structure. These parts are adjusted so as to move one within the other. Sponge 7 serves here in the capacity of a spring which causes the telescopic structure to be in an extended state. FIG. 3 provides a view of the telescopic structure when retracted, following contact with obstacle 8. 10 are the switch contacts (to be explained later).

Figure 4:
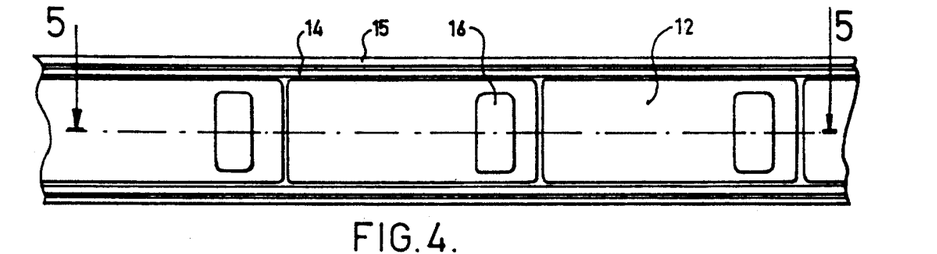
FIG. 4—is a rear sectional view of the bumper in FIG. 2.
Figure 5:
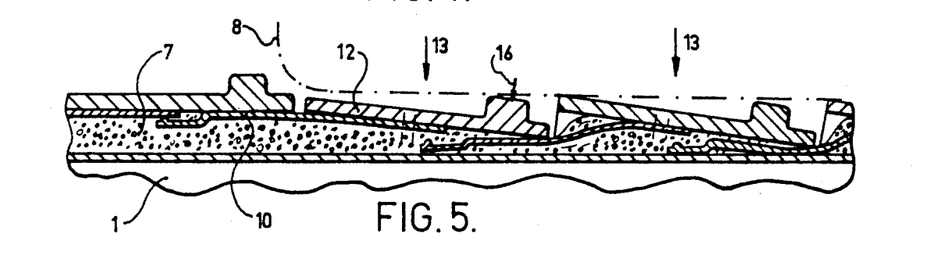
FIG. 5—is sectional plane section taken along line 5—5 of FIGS. 2 and 4, showing the sensing means in contact with a wide obstacle.
Figure 6:
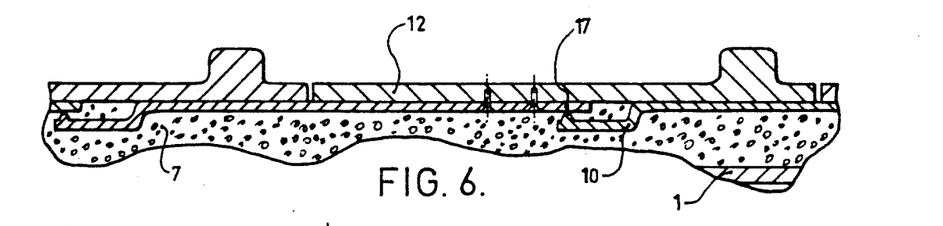
FIG. 6—is a section as in FIG. 5, but enlarged and not showing any contact between the sensing means and the obstacle.

FIG. 4, which is a rear sectional view of the rigid spongy sensor, shows that it is composed of several parts 12 located within the telescopic frame 14 and 15. 16 is a protrusion in part 12 whose function is to activate the switches 10 during contact with a straight obstacle, as demonstrated in FIG. 5. 8 is the straight obstacle which causes the protrusion 16 to move in the direction of the arrow 13, thus causing a contact break in the switches 10. FIG. 6 shows the switch contacts 10 in their normal state, i.e. when not in contact with an obstacle. In this state, the edge of the contact 17 in part 10 presses on the other end of part 10 which is adjacent to and below it. This chain-like construction of parts 12, on each of which is attached a switch contact 10, forms a serial contact conductor.

Figure 7:
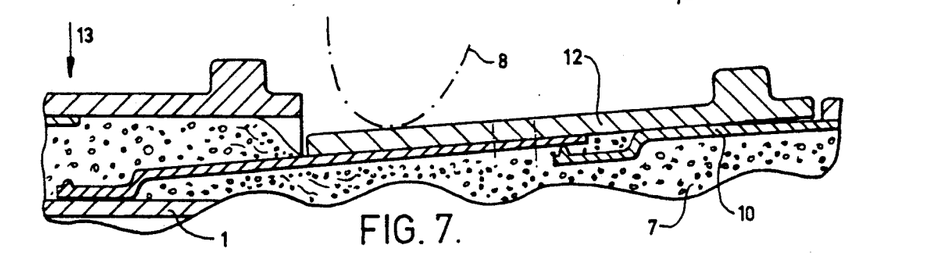
FIG. 7—is a section as in FIG. 6 showing the sensing means striking a narrow obstacle.

FIG. 7 demonstrates how obstacle 8 presses on the one side of part 12. The contact 10 which is attached to the part 12 that is being pressed inward, also moves inward in the direction of the arrow 13 and causes a contact break with contact 10 of the following link (beneath the arrow 13). This break causes an electricity break in the line.

Figure 8:
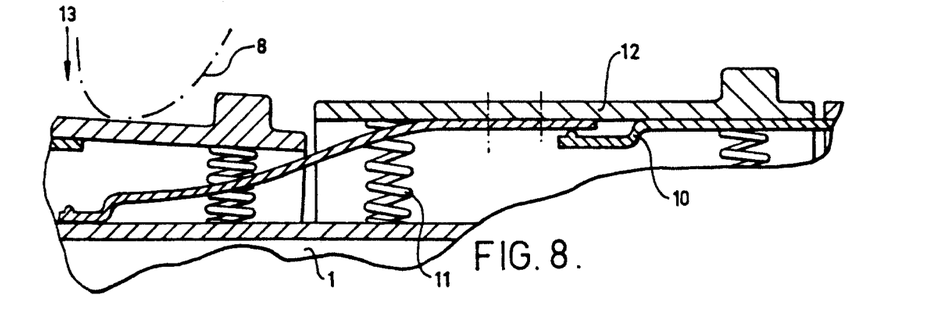
FIG. 8—is a section as in FIG. 7, but showing the sensing means striking the narrow obstacle at a different point. In addition, the sponge in the sensing means is replaced with springs.

FIG. 8 shows a situation in which the obstacle 8 strikes the one side of part 12. Here too a contact break is caused in the switches 10. Contact breaks in the switches are interpreted by the control system as a signal to activate the means by which the brakes are operated. This Fig. also demonstrates the possibility of using a spring 11 instead of the sponge 7.

Figure 9:
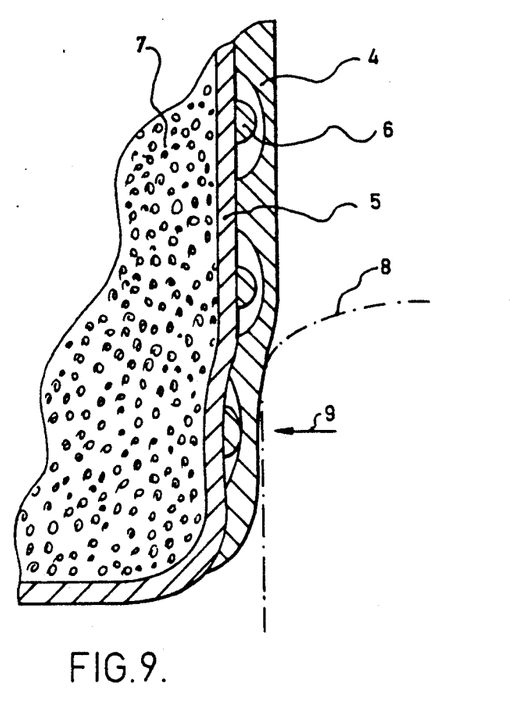
FIG. 9—is an enlarged sectional cross section of the spongy bumper sensor with the rubber switches, with a part of it in contact with an obstacle.

FIG. 9 shows the spongy bumper sensor with the rubber switches. FIG. 1 shows this sensor installed on a car bumper 1. FIG. 9 is an enlarged sectional cross section of the sensor. 7 is a sponge whose function is to contract when struck by an obstacle. Arrow 9 demonstrates a situation where contact has begun between the obstacle 8 and the rubber switch sensor. In this situation, the position of the rubber switches changes, and in this manner a command is transmitted to brake the vehicle. The sponge's contraction allows a reaction time for braking the vehicle. If the speed of the vehicle is low and the sponge is sufficiently thick, this enables braking of the vehicle until the obstacle 8 (FIG. 9) hugs the bumper 1 (FIG. 1—not drawn together), alternatively, as the change in state shown between FIGS. 2 and 3. If complete braking does not occur between, the two states, the vehicle's speed is reduced, and thus the force of the impact and the damage are lessened.

The rubber switches in FIG. 9 are installed on parts 4 and 6 which are made of electrically conductive rubber. These two parts are installed on part 5 which is also made of rubber—though rubber that does not conduct electricity and thus insulates between the two contacts 4 and 6 of the rubber switch. Arrow 9 shows a situation of impaction on an obstacle in which the two switch contacts 4 and 6 are touching each other, thus creating a short-circuit in the electricity conduction between switch contacts 4 and 6. Parts 6 should be connected by a parallel electrical connection. The creation of a short-circuit in the switch is interpreted by the control system, which activates the means by which the brakes are operated.

Figure 10:
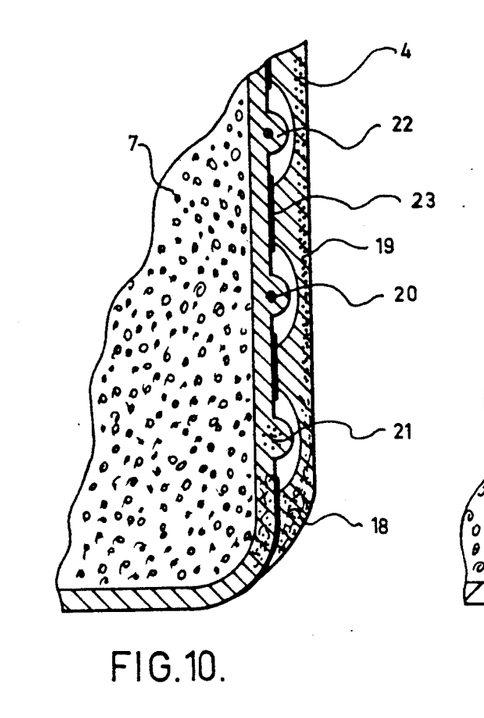
FIG. 10—is a section as in FIG. 9, showing an additional variation of the spongy bumper with the rubber switches.

FIG. 10 shows a different possibility for designing the rubber contacts of the spongy bumper. 4 and 22 are the rubber switch contacts and part 23 is the insulator between them. The rubber parts 4 and 22 are made of electrically conductive rubber; despite this, the electrical conductivity of the rubber is still poor. To improve the rubber's conductivity, it is possible to add metal fibers 18 to it, or to interweave wires 19 in it—which can also improve the mechanical strength of the outer rubber 4. Further possibilities are the production of part 22, while the center of each contact—the center of each convexity—is traversed by a normal or interlaced electric cable 20 or by thin electric wires 21.

Figure 11:
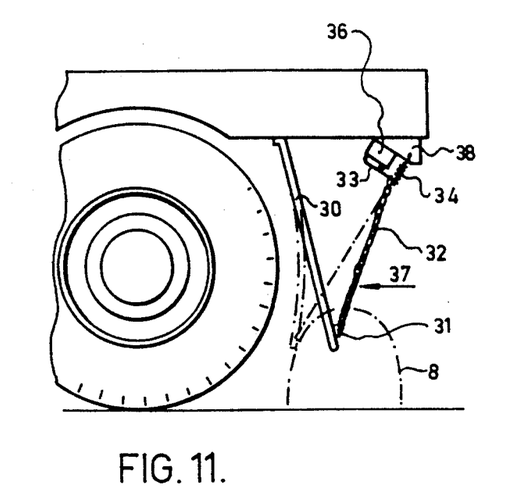
FIG. 11—is a side view of the mudguard sensor.
Figure 13:
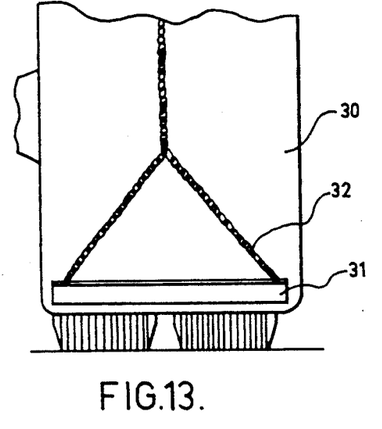
FIG. 13—is a rear view of the sensing means in FIG. 11.

FIGS. 11 and 13 show the mudguard sensor. A rod 31 is installed at the bottom of the mudguard 30. The rod is attached by means of a chain 32 to a small plate 33 which is stuck to the switch 36. A spring 34 presses the small plate 33 in such manner that it holds the switch 36 in a pressed state as long as there is no contact with an obstacle. The spring 34 is inserted between the small plate 33 and the inclined surface 38 on which the switch 36 is installed. This surface is designed to provide to the switch a working position in a direction enabling its proper functioning.

Figure 12:
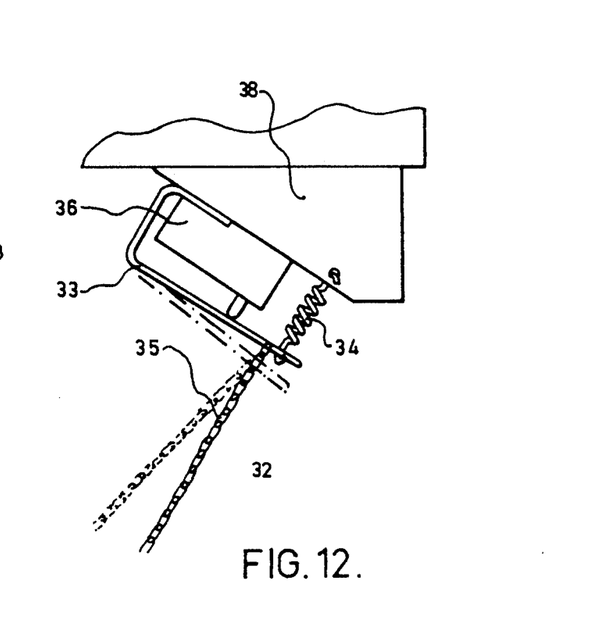
FIG. 12—is an enlargement from FIG. 11.

The fragmented lines in FIGS. 11 and 12 demonstrate a case where contact has been made with an obstacle in reverse driving. The obstacle 8 pushes the mudguard in the direction indicated by 37. The mudguard and the rod 31 pull with them the chain 32, which is connected at its one end to the rod 31 and at its other end to the small plate 33. Pulling of the small plate 33 is made possible due to the stretching of the spring 34. Pulling of the small plate 33 releases the pressel switch 35 of the switch 36, and thus an instruction is transmitted from the switch to the control system, which causes the vehicle to brake.

The electrical connection of the sensors is determined according to the type of spongy bumper sensor installed.

Where a vehicle has installed in it a spongy bumper with a rigid casing, wherein the electrical connection is one of serially connected switches, a serial connection should be used to connect all the other sensors installed in the vehicle. The switch installed in the mudguard sensor should be of a normal open type. Ordinarily, the pressel switch 35 of switch 36 (in FIG. 12) is in a pressed state, in which case the switch which is of a normal open type is now in a closed state. Contact with an obstacle causes the pressel switch to be released and the switch to be opened.

Where a vehicle has installed in it a spongy bumper with a rubber switch, wherein the electrical connection is of parallelly connected switches, a parallel connection should be used to connect all the other sensors installed in the vehicle. The mudguard sensors should be installed parallelly between them, while also being connected parallelly to the other sensing means. The switch 36 which is installed in the mudguard sensor should be of a normal closed type. Ordinarily, the pressel switch 35 of the switch 36 is in a pressed state, in which case the switch which is of a normal closed type is now in an open state. Contact with an obstacle causes the pressel switch 35 to be released and the switch contacts to be closed.

The function of the sensors whose mode of operation has been explained above is to give an electric signal during contact with an obstacle, by means of the switches which are located in the aforesaid sensors. The electrical signal is either for closing or opening the switch, in other words: a break, short-circuit or change in electrical resistance. Change in electrical resistance applies in the case of a spongy bumper sensor with rubber switches.

The electrical signal which is received from the sensors is designed to activate the system for actuating the brake applying. This system operates by means of an electromagnet which is activated upon receipt of the electrical signal from the sensors. The connection between the sensors and the electromagnet of the system for actuating the brake applying can be made simply through an electric cable. This mode of connection is defined here as "the simple control system". Later on we will describe a different connection variation, through a control system that improves the performance of the overall system, which is defined as "the complex control system".

Figure 14:
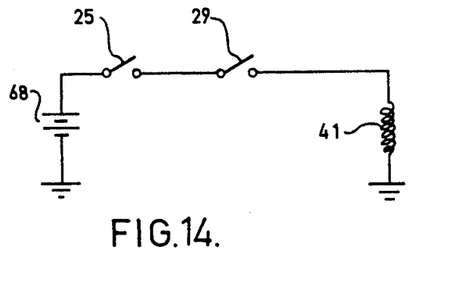
FIG. 14—is a schematic electronic diagram of the simple variation of the control means.

FIG. 14 illustrates the simple control system which provides a possibility for connecting the electric circuit contained in the present invention. In this variation, the system is activated upon ignition of the vehicle, and no importance attaches to the placement of the sensors (in front or in back), to the car's direction of travel (forward or backward) and to the speed of travel. The electric circuit of this control system includes the car battery 68 which is connected through the ignition switch 25 to 29, which is a switch that represents all the sensor switches, when these are connected parallelly. This system is suitable in the case of a parallel connection where a sensor of the spongy bumper type with rubber switches is used. In this sensor, the switches 29 must have a high electric conductivity (the method by which this property is obtained has been explained in the description of the sensor). If the switch resistance still remains high, a booster should be added at the exit from the rubber switches (to the electromagnet 41). Switch 29 is connected to the electromagnet of the system for actuating the brake applying 41. The electromagnet 41 also represents the coil 44, if such exists, in the system for actuating the brake applying (to be described hereinafter). When contact is made with an obstacle, this causes switch 29 to close, which in turn results in the activation of the electromagnet 41, and thus in the braking of the vehicle.

Where use is made of a spongy bumper sensor with a rigid casing (serially connected), the sensor switches (which are in the normal closed state) should be connected through a relay (or a switching transistor) which will direct electricity to the electromagnet 41 as soon as there is a break in the sensor switches—which is what happens when an obstacle is struck. This connection is a derivative of the complex control system which will now be described. Any other derivative and combination of the two described systems is also possible.

Figures 15, 18, 19:
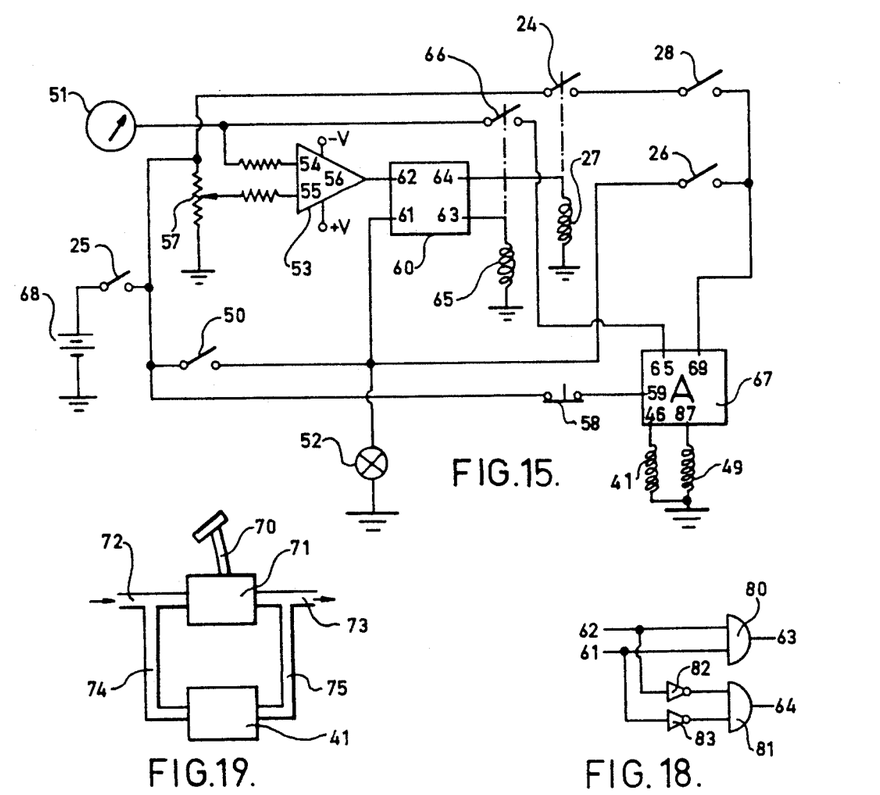
FIG. 15—is a schematic electronic diagram of the complex variation of the control means.
FIG. 18—is a schematic diagram of the logic control means in FIG. 15.
FIG. 19—is a schematic diagram of the means for actuating the brake applying in trucks.

FIG. 15 shows the control means in a complex variation. The main attributes of this variation, which are explained hereinafter, are as follows:

1. Connection of the rear impact sensors (installed in the vehicle's rear part) in reverse driving.
2. Connection of the impact sensors in slow forward driving.
3. Prevention of fast backward driving.
4. Possibility of a simple adjustment between parallel and serial sensor connections.
5. Operation of the brakes also after the obstacle is removed.

The electric power connection in the complex control system is done through the ignition switch 25.

The electric circuit which includes connection of the impact sensors in reverse driving, passes through switch 50, which is the reverse light switch 52 that is closed when the gear shift lever is in the reverse position From switch 50 the electric circuit passes through switch 26, which is the switch that represents the rear sensing means Switch 26 changes its position when contact is made with an obstacle (in a parallel circuit a short-circuit is created, and in a serial circuit a break). When this switch changes its position, an electrical signal passes to the activation circuit 67 which activates the electromagnet 41 (the electromagnet of the system for actuating the brake applying) and the electromagnet 49 of the electromagnetic valve—whose function is to prevent release of the brakes after removal of the obstacle (to be explained in the description of FIG. 21). There is a different activation circuit 67 for the serial and parallel connection circuits (an explanation on the circuit will be given in the explanations to FIGS. 16 and 17).

Connection of the front sensing means, whose switches are represented by switch 28, takes place in slow forward driving. The electric speedometer 51 delivers to the comparator 53, at point 54, a voltage level according to the vehicle's speed. The comparator 53, which is a regular operation booster, receives from the potentiometer 57 a voltage level at point 55. When the voltage level at point 54 is higher than that at point 55, which means the vehicle is at a high speed, then the comparator 53 provides an exit voltage at point 56 which is equal to a logic "1". When the vehicle is at a low speed, there is a logic "0" at point 56. When the logic control circuit 60 receives information about a logic "0" at point 62 and a logic "0" at point 61, which means that the vehicle is not in reverse gear and is not at a high speed, then the exit at point 64 is a logic "1". A logic "1" at point 64 causes the relay 27 to connect the switches of the front sensing means 28 through its contacts 24 (a switching transistor can serve as a relay).

To prevent fast driving in reverse, the complex control system activates the vehicle's brakes in order to reduce the speed of travel. When switch 50 is closed (reverse driving) the logic control circuit 60 receives from the line of the reverse light 52, at point 61, information about a logic "1". When the vehicle is at a high speed, the comparator 53 gives a logic "1" to point 62. In such a case, the logic control circuit 60 will give a logic "1" at its exit. This logic "1" activates the relay 65 which closes its switches 66 that connect the, speedometer 51 to the activation circuit 67. Details of the activation circuit are given in FIG. 16, for a parallel circuit, and in FIG. 17, for a serial circuit. The connection between the circuits described in FIGS. 16 and 17 and the main circuit in FIG. 15 is done through the connection points 46, 59, 65, 69 and 87, respectively according to these numbers. The electronic booster 45 is functionally identical in both circuits. This booster activates the electromagnet 41 according to the voltage level received from the speedometer 51. In this manner, the brake operation will be at the level required to maintain a low travel speed, and will not bring the vehicle to a stop.

Figures 16, 17, 20, 21:
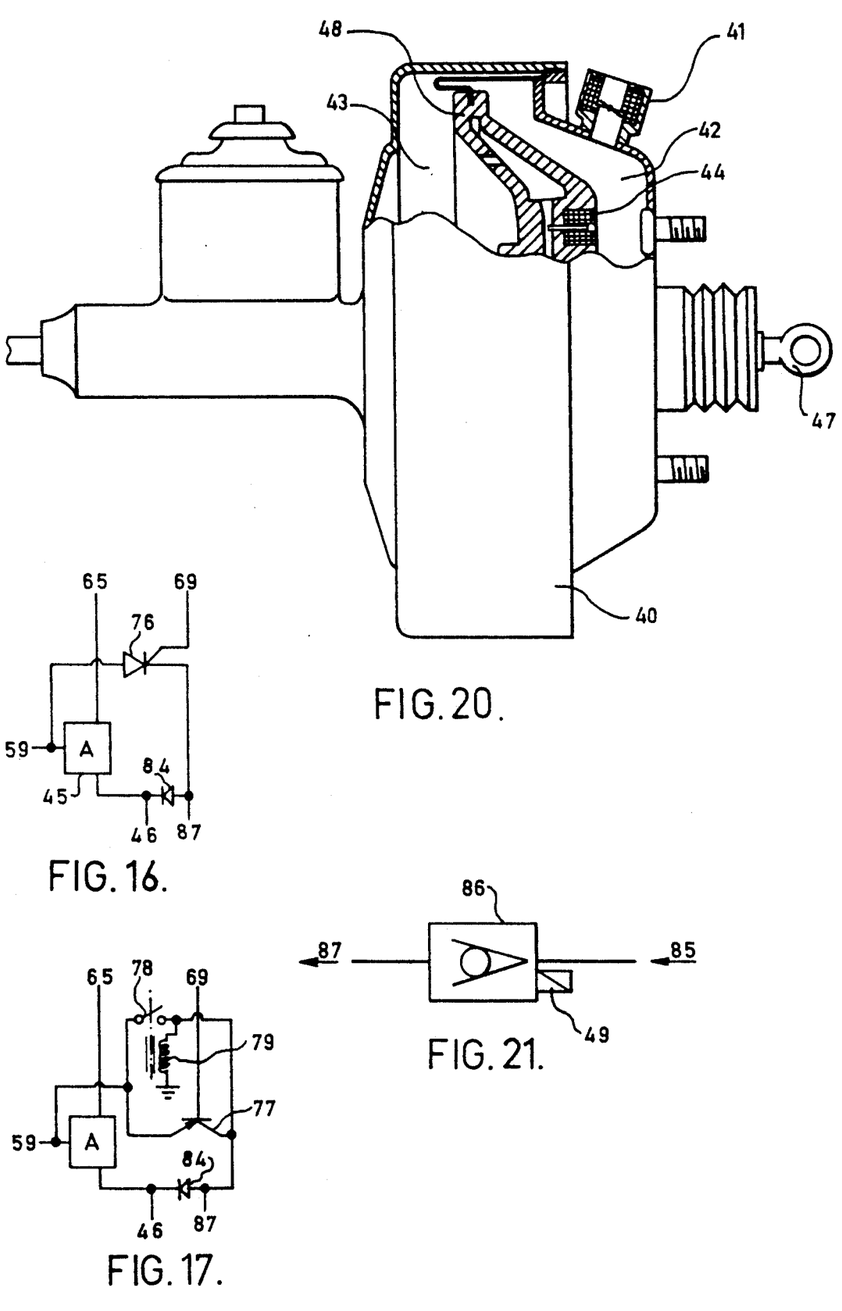
FIG. 16—is a schematic diagram of the operating system 67 in FIG. 15 for a parallel circuit.
FIG. 17—is a schematic diagram of the operating system 67 in FIG. 15 for a series circuit.
FIG. 20—is a partial section of the brake booster on which the means for actuating the brake applying are installed, in a vehicle with a hydraulic brake system.
FIG. 21—is a schematic diagram of the brake release prevention means, in a vehicle with a hydraulic brake system.

FIG. 16 describes an activation system 67 designed for a parallel circuit and suited to a spongy bumper sensor with rubber switches. Contact with an obstacle creates electrical conduction through the rubber switches of this sensor, or a short-circuit through the mudguard sensor switch, thus providing tension at point 69. Tension at point 69 causes disruption of the SCR 76 that is connected to the voltage line through point 59. The SCR conduction provides an activation current to coil 41 through point 46 and a current to activate coil 49 through point 87 and diode 84. Diode 84 is designed to prevent the activation of coil 49 by booster 45. The function of coil 49 is to prevent release of the brakes, and its operation must be prevented when maintaining a low speed in reverse driving. In addition, diode 84 serves as a buffer between the SCR 76 and booster 45. This diode inhibits the booster's effect on the SCR (an additional buffer is needed in the booster to inhibit the SCR's effect on the booster's work).

FIG. 17 describes an activation system 67 for a serial circuit and suited to a spongy bumper sensor with a rigid casing. Transistor 77, whose emitter is connected to the voltage line 59 and whose base is at point 69, will conduct as soon as there is a voltage drop at point 69. Contact with an obstacle creates a break in the sensor switches, resulting in a voltage drop at point 69. As stated, the voltage drop at point 69 causes conduction by the transistor 77. Conduction by the transistor 77 results in the activation of electromagnet 41 through point 87, and of electromagnet 49 through point 46.

In a case where an obstacle has been struck but its effect on the sensor switches has worn off, such as when a person has been hit and has fallen, the brakes should continue to be activated even after the switches are released. The electric circuit which is designed to continue providing tension to activate the electromagnets 41 and 49, in the parallel circuit in FIG. 16, is the SCR 76. The SCR will continue to conduct even after a voltage drop at point 69, which is characterized by a return of the switches to their regular position. If one wishes to release the brakes, it is necessary to press switch 58 in the driver's cabin. This switch breaks the activation voltage to the electric circuit and the electromagnets.

Holding of the electromagnets 41 and 49, in the serial circuit in FIG. 17, is performed by the relay 79. Conduction by transistor 79 causes relay 79 to pull. When relay 79 pulls, its switch 78 provides self-holding and also transmits tension for activation of the electromagnets.

FIG. 18 shows the logic control circuit in FIG. 15. This circuit is composed of two "AND" gates 80 and 81 and two "NOT" gates 82 and 83.

FIG. 19 describes the means for actuating the brake applying in trucks with an air brake system. The regular means are the brake pedal 70, the brake pedal regulator 71 which is activated by the brake pedal, the main service line 72 and a line connecting the pressure to the brakes 73. The addition in this system is provided by the pressure lines 74 and 75, which serve as a parallel connection between the regulator 71 and the electromagnetic regulator 41 which has been added in the present invention. The electromagnetic regulator 41 performs the same action as that performed by regulator 71, but with electrical activation. This regulator can also serve as a regular electromagnetic valve.

FIG. 20 describes the means for actuating the brake applying in vehicles with a hydraulic system. These means are activated according to an electric signal (current) which is received from the control system and which causes activation of electromagnet 41. Electromagnet 41 and electromagnet 44, (not essential) form the additions which have been introduced into the regular brake booster, for the purpose of this invention. The principle of operation of a regular brake booster is the utilization of the subpressure created in the engine (the suction action) to create a pressure difference on piston 48 which is located in the brake booster. The force created by this pressure difference is utilized to reduce the force needed by the driver to press on the brake pedal. During normal action of the brake booster, the vehicle's engine creates a vacuum on either side of the driving piston 48, i.e. in the vacuum chamber 43 and in the air chamber 42. Pressure on the brake pedal causes the push rod 47 to be pressed and thus to open the valve (not shown) which connects the air chamber 42 to the free air.

The pressure difference which is created between the two chambers causes the power piston 48 to move in the direction of the vacuum chamber 43 and thus to activate the brakes. One of the functions of the valve and regulator system (not shown) which is placed in a regular brake booster is to give the driver the sensation of braking, just as in a vehicle without a brake booster, but with less force. This activation force is not required to activate the brakes. In the present invention, the brakes are activated entirely through the force created by the brake booster. For this purpose we have added, in the brake booster, the electromagnetic valve 41 which is connected to the air chamber 42. This valve, as soon as it is opened, by electrical activation, creates free air passage to the air chamber 42. Penetration of air into the air chamber 42, whether by means of the electromagnetic valve 41 or by means of the regular valves which are operated by the push rod 47, causes the power piston 48 to move towards the vacuum chamber 43. From this point onwards there is no further change in the braking action.

Addition of the electromagnetic valve 44 over the channel which connects the air chamber 42 to the vacuum chamber 43 can enhance the effectiveness of the action of the electromagnetic valve 41. The function of this channel is to remove the air from the air chamber—air flows through it to the vacuum chamber, and thus piston 48 is returned to its initial position. Valve 44, the moment it is closed, prevents the passage of air between the two chambers 42 and 43, and in this manner helps to create a large pressure difference on the piston 48. This operation should take place when electromagnet 41 is activated, and thus the braking effectiveness is improved. (Normally, valves which are activated by the push rod 47 serve to block the connecting channel between the two chambers.) The electrical connection of electromagnet 44 (not shown in FIG. 15) is to electromagnet 41, with both electromagnets being connected parallelly.

Activation of the brakes also after removal of the obstacle is performed by means of an electrical instruction received from the complex control unit (described in the explanation to FIG. 15). In trucks with an air brake system, the addition of other means is not necessary. The air tank will provide pressure to the brakes even if the truck's engine has been extinguished due to the sudden braking. In vehicles with a hydraulic brake system, if the driver has not pressed the clutch pedal at the end of the braking action, the engine is liable to be extinguished. Extinguishing of the engine causes the creation of the vacuum, which is formed during the suction operation in the engine and which is required for the action of the brake booster, to be discontinued. For this reason, extinguishing the engine causes the brakes to be released, in spite of the continued operation of electromagnet 41.

FIG. 21 describes the means for preventing release of the brakes in a vehicle with a hydraulic brake system, following the extinguishing of the motor This means is a nonreversing electromagnetic valve 86 which is activated by means of electromagnet 49. This valve is installed behind the brake booster on the pressure exit line of the brake oil. Arrow 85 shows the direction of entry of the oil from the brake booster to the nonreversing valve 86 Arrow 87 shows the direction of exit of the brake oil from the brake booster to the brake pumps (not shown) in the car wheels. In the normal working state, valve 86 is open to a two-directional flow. When valve 86 is activated on striking an obstacle, the passage of the oil through it can be effected only in the direction indicated by with no possibility of return. This operation causes the car brakes to remain locked for as long as the electromagnet 49 is activated. To release the brakes, it is necessary to press switch 58, shown in FIG. 15, which is located in the driver's cabin. This switch causes a break in the voltage received by the system for actuating the brake applying, including electromagnet 49, and in this manner the vehicle resumes its normal functioning after striking an obstacle.

I claim:

1. A device for automatic brake of a vehicle on striking an obstacle, comprising:
   sensors for detecting the striking of the obstacle, including:
   (a) a spongy impact sensor with a rigid casing,
   (b) a spongy impact sensor with rubber switches,
   (c) a mudguard sensor,
   control means for actuating the brake, according to an electric signal delivered from the impact sensors depending on the direction of travel and the vehicle's speed,
   means for actuating the brake.

2. The system in claim 1, wherein the spongy bumper sensor with the rigid casing contains a sponge on which are parallelly installed several rigid telescopic casings, to each of which is attached an electric switch, and which together form a chain of serially connected switches, such that an impact on one of the telescopic casings causes an electric break in the switches.

3. The system in claim 1, wherein the spongy bumper sensor with the rubber switches contains a sponge on which are two layers of conductive rubber which serve as the switch contacts, and between which there is insulation, being in part air which forms the space between the switch contacts, said switches being parallelly connected, and where an impact on one of them causes electrical conduction.

4. A device for automatic brake of a vehicle on striking an obstacle, in a vehicle with a hydraulic brake system that have control means for actuating the brake according to an electric signal delivered from the impact sensors depending on the direction of travel and the vehicle's speed and means for actuating the brake that include a brake booster with an electromagnetic valve which is installed on the air chamber in the brake booster and which causes the actuating of the car brakes and means for preventing release of the brakes after removal of the obstacle that include a nonreversing electromagnetic valve installed behind the brake booster, said impact sensors for detecting the striking of an obstacle including:
   (a) a spongy bumper sensor with the rigid casing,
   (b) a spongy bumper sensor with the rubber switches,
   (c) a mudguard sensor.

5. A device for automatic brake of a vehicle on striking an obstacle, in a vehicle with a pneumatic brake system that have control means for actuating the brake according to an electric signal delivered from the impact sensors depending on the direction of travel and the vehicle's speed and means for actuating the brake that include an electromagnetic regulator which is attached parallel to the brake pedal regulator, said impact sensors for detecting the striking of an obstacle including:
   (a) a spongy bumper sensor with the rigid casing,
   (b) a spongy bumper sensor with the rubber switches,
   (c) a mudguard sensor.

6. The device in claim 2, wherein a spring replace the sponge in the spongy bumper sensor with the rigid casing.

7. The device in claim 3, wherein the electrical conductivity of the rubber in a spongy bumper sensor with the rubber switches is improve conductivity.

8. The device in claim 5, wherein the mudguard sensor have a chain which connected his switch to a rod installed at the bottom of the mudguard.

* * * * *